May 7, 1946.   J. G. SCHMIDT   2,399,831
COLLET CHUCK
Filed June 8, 1944   2 Sheets-Sheet 1
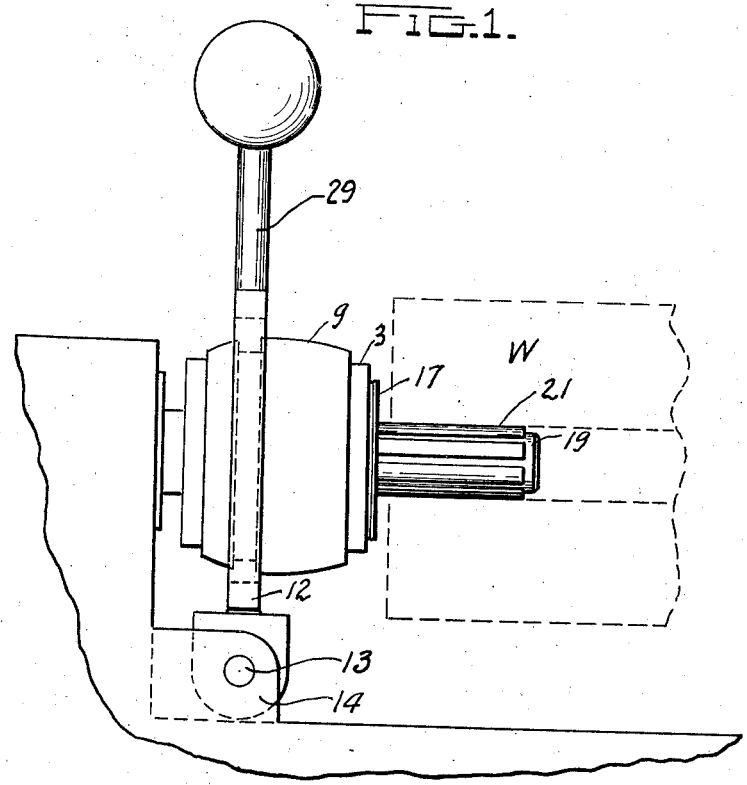
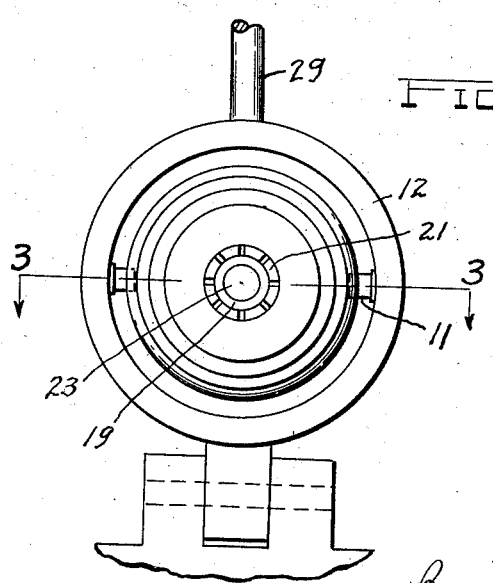
INVENTOR.
John G. Schmidt

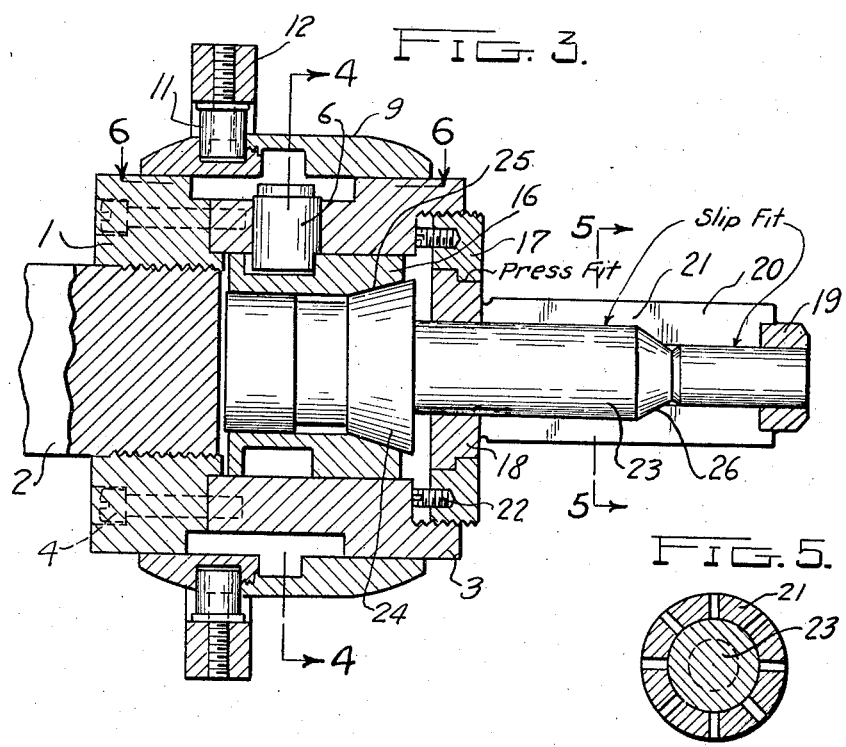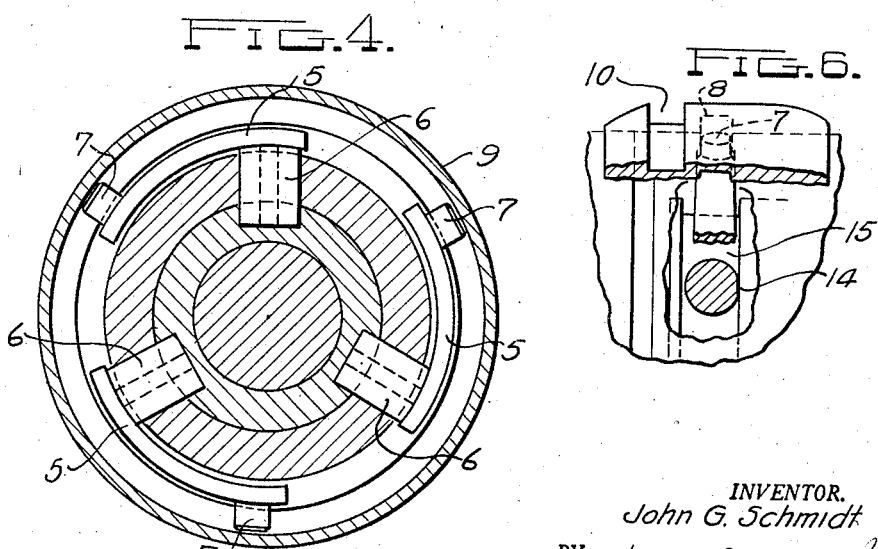

Patented May 7, 1946

2,399,831

UNITED STATES PATENT OFFICE 2,399,831

COLLET CHUCK

John G. Schmidt, Detroit, Mich., assignor to Arthur V. Whittington, Detroit, Mich.

Application June 8, 1944, Serial No. 539,314

5 Claims. (Cl. 279—2)

This invention relates to collet chucks.

In my prior application Serial No. 512,356, filed November 30, 1943, I have shown and described a collet chuck adapted to contract a gripping member to engage the work or shaft, but this chuck is capable only for contracting on the work.

It is the object of the present invention to provide an improvement on this chuck in the way of an interchangeable sub-assembly which may be substituted for the split sleeve in my prior application, and provide a gripping member on the outside of the chuck which is arranged to expand for the purpose of gripping on the inside the work or member to be held.

Referring to the drawings:

Fig. 1 is a side-elevation of the chuck showing its connection with the work.

Fig. 2 is an end elevation of the chuck.

Fig. 3 is a longitudinal section of the same.

Figs. 4, 5 and 6 are sections taken on the correspondingly numbered section lines of Fig. 3.

The chuck comprises a head or collar 1 having a threaded engagement with the end of the shaft 2. A ring 3 is secured by bolts 4 to this collar 1. In this ring are journalled the four arcuate levers 5 by combined pivot pins and cams 6. These levers have pins 7 on their ends which engage in the annular groove 8 on the inside of the sliding sleeve 9. This sliding sleeve has an annular external groove 10 in which rollers 11, carried on the inside of the ring 12, engage. This ring 12 is pivoted at 13 in brackets 14 in the bed of the machine. The ring, together with the stem 29, constitutes a lever by which the sleeve 9 may be moved longitudinally with respect to the chuck. This serves to turn the combined pivots and cams 6. The cam has a flat face at 14 adapted to rest against the right-hand wall of the groove 15 in the slidable actuating sleeve 16. When the cam is turned from the position shown in Fig. 6, where the flat face of the cam abuts against the right-hand wall of the groove 15, as shown also in Fig. 3, this brings the high side of the cam against the right-hand wall of groove 15 and forces sleeve 16 to the right (Fig. 3).

This much of the construction is old and is shown and described in my prior application Serial No. 512,356, filed November 30, 1943. In place of the gripping sleeve and the screw plug used at the end of the chuck in that application, I employ a screw plug 17 into which is press-fitted an expansible mandrel. This mandrel has a ring 18 at one end and a small ring 19 at the other end connected by integral longitudinal bars 20. These bars are wider at their inner end than their outer end, the narrow and the wider portions being connected by the bevels 21. This mandrel is machined out of a single bar of stock to form the integral rings and the connecting bars. The plug 17 can be provided with set screws 22 that form stop gauges to limit the distance that the plug may be screwed into the member 3.

Before this plug 17, which carries the mandrel is screwed into the end of the ring 3, the core piece or arbor 23 is inserted in the chuck and the beveled shoulder 24 contacts with the beveled counterbored portion 25 of the sliding sleeve 16. This core piece has another beveled shoulder 26 which is arranged to contact the beveled portions 21 of the longitudinal bars 20 of the expanding mandrel. The gauge screws 22 are so set that when the plug 17 is screwed into the end of the ring 3 the beveled surfaces 26 and 21 of the core piece and the longitudinal bars approximately contact.

It will be apparent now that if the lever and the ring 12 are swung from the position shown in Fig. 3 in either direction that this will cause the cam 6 to be rotated so as to bring a higher portion of the cam in contact with the right-hand wall of the groove 15 and thereby cause the sleeve 16 to move outwardly. This will cause the beveled surfaces 24 and 25 to engage and move the core piece or actuator 23 outwardly, thereby causing also the beveled shoulder 26 to engage the beveled surfaces on the longitudinal bars. This springs or distorts these bars outwardly, the mandrel being constructed of steel which will permit this distortion. Consequently, the size of the mandrel enlarges and this will serve to grip a piece of work W which is fitted over the mandrel.

What I claim is:

1. In a collet chuck provided with a head and an actuating sleeve which is arranged to be moved longitudinally of said head to cause the chuck to grip the work, a work-gripping unit comprising a core piece in the form of an arbor arranged to be contacted by the said sleeve to move the same longitudinally of the chuck, and an expansible mandrel comprising a sleeve-like member anchored at its inner end to said head and provided with a plurality of longitudinally running, spaced distortable bars having interior surfaces arranged to contact a surface of the core piece when the core piece is moved longitudinally outwardly in the chuck, thereby to distort and expand the bars of the mandrel to grip the work.

2. In a collet chuck provided with a head and an actuating sleeve which is arranged to be moved longitudinally of said head to cause the chuck to grip the work, a work-gripping unit comprising a core piece in the form of an arbor having a beveled shoulder and arranged to be contacted by the said sleeve to move the same longitudinally of the chuck, and an expansible mandrel comprising a sleeve-like member anchored at its inner end to said head and provided with a plurality of longitudinally running, spaced distortable bars having interior beveled surfaces arranged to contact said beveled shoulder of the core piece is moved longitudinally outwardly in the chuck, thereby to distort and expand the bars of the mandrel to grip the work.

3. In a collet chuck provided with a head and an actuating sleeve which is arranged to be moved longitudinally of said head to cause the chuck to grip the work, a work-gripping unit comprising a core piece in the form of an arbor arranged to be contacted by the said sleeve to move the same longitudinally of the chuck, an expansible mandrel comprising a sleeve-like member anchored at its inner end to said head and provided with a plurality of longitudinally running, spaced distortable bars having interior surfaces arranged to contact a surface of the core piece when the core piece is moved longitudinally outwardly in the chuck, thereby to distort and expand the bars of the mandrel to grip the work and a threaded plug for screwing into said chuck and carrying said mandrel.

4. In a collet chuck provided with a head and an actuating sleeve which is arranged to be moved longitudinally of said head to cause the chuck to grip the work, a work-gripping unit comprising a core piece in the form of an arbor arranged to be contacted by the said sleeve to move the same longitudinally of the chuck, an expansible mandrel comprising a sleeve-like member provided with a plurality of longitudinally running, spaced distortable bars having interior surfaces arranged to contact a surface of the core piece when the core piece is moved longitudinally outwardly in the chuck, thereby to distort and expand the bars of the mandrel to grip the work and a threaded plug having gauge screws and for screwing into said head and carrying said mandrel, the said gauge screws serving to properly locate the position of said mandrel.

5. In a collet chuck provided with a head and an actuating sleeve which is arranged to be moved longitudinally of said head to cause the chuck to grip the work, a work-gripping unit comprising a core piece in the form of an arbor arranged to be contacted by the said sleeve to move the same longitudinally of the chuck, an expansible mandrel comprising a sleeve-like member provided with a plurality of longitudinally running, spaced distortable bars having interior surfaces arranged to contact a surface of the core piece when the core piece is moved longitudinally outwardly in the chuck, thereby to distort and expand the bars of the mandrel to grip the work, and a plug for securing in said head and in which said mandrel is anchored.

JOHN G. SCHMIDT.